United States Patent [19]

Douglass

[11] 3,742,369

[45] June 26, 1973

[54] CAPACITOR WITH FIBERED VALVE METAL ANODE

[76] Inventor: Richard W. Douglass, 12 Oakland Ave., Needham, Mass.

[22] Filed: Nov. 8, 1971

[21] Appl. No.: 196,812

Related U.S. Application Data

[60] Division of Ser. No. 839,024, July 3, 1969, abandoned, which is a continuation-in-part of Ser. No. 807,129, March 13, 1969, abandoned, and a continuation-in-part of Ser. No. 869,404, March 13, 1969, Pat. No. 3,681,063, said Ser. No. 807,129, is a continuation of Ser. No. 626,773, March 29, 1967, abandoned, said Ser. No. 869,404, is a division of Ser. No. 626,773, March 29, 1967, abandoned.

[52] U.S. Cl.................... 317/230, 29/182, 29/192, 29/419, 29/424, 29/570
[51] Int. Cl............................................... H01g 9/05
[58] Field of Search...................... 317/230; 29/182, 29/192, 419, 420.5, 570; 75/204

[56] References Cited
UNITED STATES PATENTS 2,277,687   3/1942   Brennan............................. 317/230
2,278,161   3/1942   Brennan............................. 317/230
2,299,667   10/1942  Waterman.......................... 317/230
2,616,165   11/1952  Brennan............................. 317/230

*Primary Examiner*—John W. Huckert
*Assistant Examiner*—William D. Larkins
*Attorney*—Oliver W. Hayes and Jerry Cohen

[57]   ABSTRACT

Capacitor anodes are produced in situ by sintering a powdered valve metal into a porous compact, impregnating the compact with another material in fluid or soft form which fills the pores of the compact, solidifying or hardening the second material and working the compact through the application of compressive forces to elongate it to thereby fiber the powders of the compact and to fiber the impregnant. The thus produced fiber compact is leached to remove the impregnant materials, to produce a bundle of interconnected fibers with an interconnected pore structure which can be filled with anodizing medium and later with electrolyte to comprise the capacitor. Alternatively, the impregnant can be the valve metal and the original compact can be removed after elongation and fibering.

4 Claims, 8 Drawing Figures

Patented June 26, 1973

CAPACITOR WITH FIBERED VALVE METAL ANODE

This is a division of Ser. No. 839,024, filed July 3, 1969, now abandoned, which is a continuation in part of Ser. No. 807,129, filed Mar. 13, 1969, now abandoned, and 869,404, filed Mar. 13, 1969, now U.S. Pat. No. 3,681,063, Aug. 1, 1972; 807,129 and 869,404 being respectively a continuation and division of Ser. No. 626,773, filed Mar. 29, 1967, now abandoned.

The present invention relates to fibers or filaments (hereinafter "fibers") generally of metal useful for capacitor electrode manufacture, the production of such fibers and capacitors and the resultant products so formed and to electrodes for similar electrical and electrochemical translating devices.

BACKGROUND

It is a continuing objective of the capacitor industry to enhance effective surface area particularly for dielectrics formed of surface layer oxides of expensive valve metals such as tantalum. Progress has been made in developing fine powder blends which can be sintered to porous anode electrodes offering specific capacitance of about 6,000 microforad-volts per gram (standard industry wet cell testing in 0.01% $H_3PO_4$ for anode with surface layer dielectric oxide formed to 200 volts in 10% $H_3PO_4$). But further progress is needed to make high quality expensive materials such as tantalum economically attractive in areas of the capacitor industry served by cheaper materials (e.g., aluminum foil capacitors for entertainment devices) or to meet the existing demand for better capacitance per unit of weight and volume in the applications served by state of the art capacitors. Some attempts have been made in the industry's technical and market development efforts from time to time to utilize fibers rather than powders; but it appears these have not succeeded to any substantial extent and the overwhelming major emphasis in the field has been on powder improvement in microparticle capacitors anodes and in various types of etching of sheets or wire for those types of anodes.

OBJECTS

The objects of the invention are to achieve an increase in surface area enhancement and thereby form products suitable as anodes for electrolytic capacitors or the like with higher realizable capacitance compared to prior art.

It is a related object of the invention to provide such products and methods of making them affording higher capacitance per unit weight of product and reduction in manufacturing expense in relation to capacitance achieved compared to the prior art.

It is a further object of the invention to allow utilization of a more favorable range of starting materials in production of anodes and a more favorable range of processing conditions in anode production.

It is a further object of the invention to partially intergrate production of electrode materials and anodes producing anodes in-situ as the anode material is produced in-situ.

It is a further object of the invention to improve purity of anode materials.

Each of the various objects are to be attained singly and/or consistent with several of the other objects.

GENERAL DESCRIPTION

The objects of the invention are achieved through a novel combination of two techniques previously used as separate methods for making capacitor anode materials — forming a porous compact and mechanically working it. There are two basic approaches to this concept. First, a high porosity compact of fine valve metal powders (3 to 10 microns Fisher Average Particle Diameter) with a high surface-to-weight ratio will have high capacitance as noted above. This capacitance can be substantially increased by working the compact through the application of compressive forces under conditions set forth below to elongate the compact and fiber the powder particle therein. A second approach, which is preferred and distinctly advantageous, is to start with a compact made of larger particles than those which are conventionally used for capacitors and fiber those particles with a higher degree of reduction than in the first case. The valve metal is produced in powder form in a very coarse size range — the bulk of it in excess of 44 microns (as compared to the conventional 3–10 micron Fisher Average Particle Diameter capacitor grade powders) and with less than 25 percent of it by weight preferably none, in the −325 mesh size range. The compact is generally made by compacting simple powders by pressing and/or sintering. It is also within the scope of the invention that the compact can be made of pre-agglomerated powders, a spongy ingot or open-pore foamed metal rather than of simple powders. In these cases, powder sizes refer to the nearest equivalent powder sizes which would be required to form a similar compact.

The powders are compacted, preferably by sintering to form a porous compact or a compact with a porous (interconnected open pores) skeletal structure of bonded particles is otherwise formed as indicated above. The porous compact is impregnated with a molten or soft flowable fluid material (e.g., molten metal or "molten" glass or salt or plastic in softened form) and then solidified (hardened). The impregnated compact is mechanically worked to an elongated form by the application of compressive forces. The result of the elongation of the impregnated compact is that individual particles of the porous compact form long fibers. The size of each individual particle is reduced in proportion to the reduction of the impregnated body. The fibers are cross-linked to each other in the elongated compact by elongated metallurgical bonds that were formed by the original powder compaction; the bonds are stretched out as a result of the mechanical working for elongation. The impregnant forms similar interconnected fiber structure. The elongated compact is leached or otherwise treated to remove the impregnant. Alternatively, the impregnant can be the valve metal and the original compact can be removed after elongation.

It is preferred that the final fiber be in the range of less than 25 microns and preferably 0.5–10 microns in diameter and that this be achieved through a reduction ratio (ratio of original particle diameters for the compacted material or impregnant to final fiber diameters, corresponding to the ratio of original compact diameter to final compact diameter) of at least 3:1 and no greater than 100:1, generally no greater than 25:1.

Process conditions, including powder selection consolidation and fabrication, can be adjusted to the end that (a) upon leaching the bundle of fibers retains its pre-leached dimensions or (b) that it expands to 5 or 10 times its original size upon leaching.

The resultant product is a porous fiber bundle of elongated valve metal fibers linked by bonds spaced along the fiber lengths.

This product can be used, per se, or cut to shorter lengths suitable for use as electrodes. The cut lengths will comprise similar products. In the cut products there will be a substantial number of fibers running the full length thereof. If the product is compressed in a manner to flatten it out transversely then such fibers would run its full width or, in any event, the full extent of some characteristic dimension of the bundle.

The fiber bundle may then be provided with an electrical lead wire and anodized to form a suitable oxide layer at its surface, in accordance with conventional capacitor technology practice. The bundle may optionally be re-sintered prior to anodization. Formation of anodic oxide film is followed by impregnating the fibrous bundle with an electrolyte and application of a counter-electrode to produce a capacitor.

The principal distinguishing characteristics of the fiber bundle (anode) product is the essentially parallel coelongation of its fibers and the metallurgical cross-linking of the elongated fibers to each other at widely spaced points along the fiber length. The cross-links correspond primarily to earlier sinter connection points between the original powders used as fiber precursors.

The advantages of the invention include the following:

1. A very high degree of material surface are enhancement and high surface to weight and surface to volume ratios are obtained,
2. Contacts between elements (fibers) are spaced along the fiber length and occupy only a fraction of fiber periphery allowing a more complete covering of the element with dielectric oxide film, compared to powders which have essentially all elements partially bridged to each other with relatively less free area and less control of bridged vs. free area. Product control is also enhanced by having fibers run the full length of the capacitor body,
3. The starting powder can be very large,
4. Purity can be attained in the starting powder of in the starting compact by high temperature sintering of large particles (e.g., 2200°C) which does not substantially reduce porosity, rather than as a later step which reduces porosity. Later sintering or annealing or thermal leaching, if any, can be at much lower temperature than conventional powder or fiber sintering temperatures. Purity, at least with respect to metallic impurity content, is further enhanced by the formation of new metal surface through the powder fiberizing process. That is, a single powder particle to be used for fibering will have the same order of magnitude of impurity content as a fine powder particle used as capacitor making powder per se. But the fibering of a single large particle will produce a surface area (and capacitance) much greater than that of a single fine particle (or equivalent to many fine particles). Thus, if the fibering does not offset this purity advantage through impregnant impurities or incomplete removal of impregnant, the fibering approach will allow fewer impurities in relation to surface area and capacitance. Another aspect of the impurity question is that as a particle is fibered, new surface is created under contaminant-free (or, more accurately), contaminant-dispersing conditions.

Published reports of work by others on fiber based capacitors appears in U.S. Pat. Nos. 2,277,687; 2,278,161; 2,616,165; 3,373,320; British Pat. No. 1,154,599 (see also U.S. Pat. No. 2,299,667) and is useful in understanding the scope of the present contribution. Additionally, references cited in and for the above U.S. applications should be noted.

Distinguishing features of the product of the present invention partially related to the advantages and partially useful for identification without any necessary relation to advantages are:

1. As noted above, the fibers are elongated and the total fiber bundle which constitutes an anode (generically "electrode" and including sub-anode segments) substantially all extend parallel in the common direction of elongation and run the length of the anode.
2. The fibers have fiber to fiber bonds spaced along the anode length. The bonds are stretched out to a random variety of lengths reflecting the fact that in the original compact they were disposed at random angles of attack to the direction(s) of elongation. But the random bond lengths are substantially greater than average fiber diameter.
3. The free surface area of the fibers is much greater than the area occupied by bonds.
4. However, the average fiber cross-section area is less than the average fiber to fiber junction area. This can be proven geometrically by analyzing a random lateral junction lying in the plane of elongation. It starts out with a smaller area than the adjacent particle. But then in fibering, the junction stretches its length by a factor which is the square of particle diameter reduction ratio and practical diameter reduction ratios for purposes of capacitor anodes or the like are at least 3:1, preferably in the range of 5:1 to 25:1. This change of area ratio can be observed directly through microscopic inspection or indirectly through comparative resistance measurements. See also item (2) above.
5. The fiber diameters will generally be of different diameters and generally the various diameters of fibers will vary over a continuous spectrum, reflecting the difficulty of precisely sizing starting powders and the common ratio of area reduction of the powders.

Another significant advantage of capacitor anodes made according to the present invention is that dissipation factor does not increase monotonically with capacitance. As fibering is increased to enhance surface area and capacitance, dissipation factor remains substantially constant. This is in surprising contrast to the fine powder systems and some reported data on the fine fiber capacitor system of the above cited British patent. The reason for this surprising result is now known but is believed to be related to three factors: (1) the uniformity and adequacy of pore cross-section area and volume inherent in the formation of in-situ anode due to elongation which assures good conductance through the pore-filling electrolyte — i.e., the pores of the fiber anode are of the same order of cross-section diameter (3–5 microns with no expansion) as the pores of powder compacts, but are more uniform in relation to each other; (2) a lesser factor is the presence of rated (or non de-rated large junctions between fibers — i.e., the lateral area of fiber to fiber contacts are greater than average fiber diameter and therefore are not high resistance hot spots as in powder-to-powder contacts or as in sinter contacts of crossing-over random oriented fibers; (3) the low aggregate fiber to fiber contact surface in relation to free fiber surface and the low density of the fiber bundle, even in the most rigid arrangement of the fiber bundle.

Finally, it should be noted that the process and product of the present invention offer the additional advantage over fibers of the type described in the British patent (which are probably made by the method described in the owner's U.S. Pat. Nos. 3,277,564 and 3,378,999; see also Levi, U.S. Pat. No. 3,029,496) that the fibering and fiber-to-fiber joining is accomplished by a presinter and a single series of elongation steps without intermediate rebundling and with a far lesser degree of fiber reduction to produce finer fiber sizes (due to starting from powders rather than rod or billet).

Other objects, features and advantages, including additional species, are in part described below and will in part be apparent to those skilled in the art from the present disclosure.

SPECIFIC DESCRIPTION

The invention is now described in detail in regard to certain of its various embodiments each of which is set forth as distinctly advantageous, per se, and also as illustrative of the described invention in its broader aspects with reference to the accompanying drawings wherein.

Figure 1:
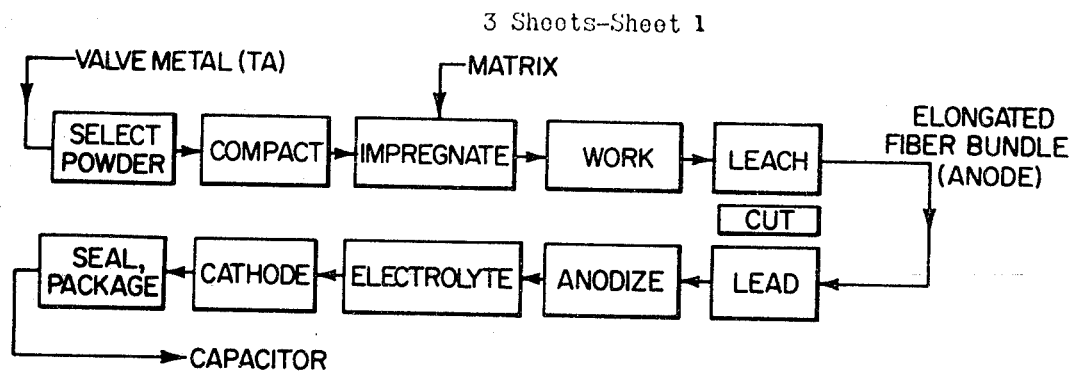
FIG. 1 is a block diagram of fiber bundle (anode) and capacitor basic production process.

FIG. 1 is a block diagram of the process of the invention according to the best known mode of practicing it. The steps of making a compact suitable for capacitor use are (1) selection and sizing of powders of the valve metal, (2) forming the metal into a coherent compact, (3) impregnating the compact with another material, (4) working the compact by elongation to fiber the film-forming metal, (5) removing the impregnant material by chemical and/or thermal leaching to leave a porous metal compact of cross-linked fibers of the valve metal. The further steps to form a capacitor are (6) adding an anode (generically "electrode") lead means to the compact, (7) forming a dielectric oxide film on the metal fibers (8) adding an electrolyte material in the porous compact, (9) adding a cathode (or generically "counter-electrode") lead means to the electrolyte without contacting the compact directly, (10) sealing and packaging. At any step after working (or removing impregnant material) short lengths can be cut out of the product.

The fibers of the invention are characterized in that each fiber is derived from a single powder particle and its length is dependent on the degree of diameter reduction. For instance, an 8 micron diameter powder particle fibered to 0.1 microns diameter will have a length of about 1 inch, a 30 micron diameter particle fibered to 0.1 microns diameter will have a length of about 70 inches. Further working to finer fiber diameters would further increase the length. In most applications of the invention, useful fibers will have a length of 10 times the diameter of the fiber or longer (as high as $10^6$ times for extreme cases).

The bundled felts of the inventions are characterized by substantial cross-linking by metallurgical bonds between tangentially contacting fibers corresponding to the bonds between powders in the original powder compact skeleton.

Figure 2:
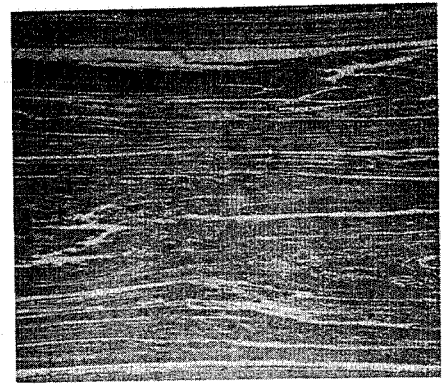
FIG. 2 is a photomicrograph of a fiber bundle in its working matrix.

FIG. 2 shows a longitudinal section photomicrograph of a composite in the form of a wire of 0.039 inch diameter at 133 times magnification. The composite has elongated reinforcing tantalum fibers in a matrix of copper. The starting material for the fibered metal was coarse melting grade powder minus 12 and plus 60 mesh at 18,000 psi and sintered at 2,300°C for 1 hour to produce a compact of 61 percent density.

Figure 3:
FIG. 3 is a photomicrograph of a fiber bundle after matrix removal.
Figure 5:
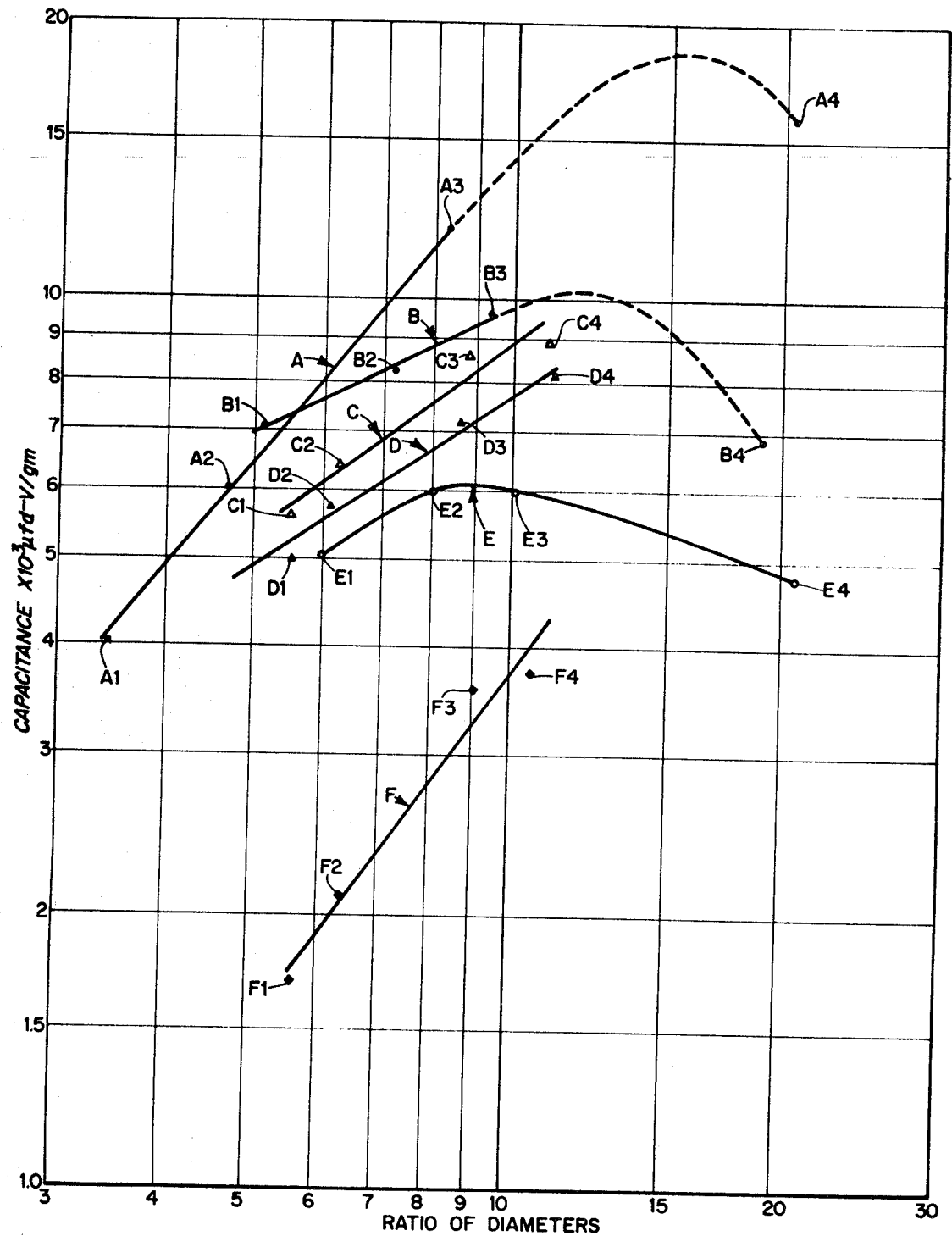
FIG. 5 is a graph of performance characteristics.

FIG. 3 shows a longitudinal section photomicrograph of a tantalum metal felt, encapsulated in a molding resin for microscope examination, at 266 times magnification. The tantalum was made from nominal 8 micron diameter (FAPD) powders (minus 100 mesh and plus 5 microns) which was consolidated to a compact of about 50 percent density and then impregnated with copper and then swaged to rod and rolled to sheet after which the copper was leached out in a nitric acid bath. Upon leaching the metal felt swelled up to several times its original volume.

The fiber cross-section form will vary according to the form of mechanical elongation applied. The term "diameter" as used herein refers to diameter of a circle or for other shapes, diameter of equivalent-area circle. The term "fiber" includes slab-like square fibers (e.g., produced by cross-rolling along two axes of elongation) as well as the more typical flat and round fibers elongated along a single axis.

The practice of the invention is further illustrated by the following non-limiting examples.

EXAMPLE 1

A mold was filled with tantalum powder of about 8 micron diameter (FAPD) (−100 mesh and plus 5 microns) and the powder was sintered in the mold at 1,500°C for 20 minutes to form a green compact. Then sintering was completed by removing the compact from the mold and heating at 2,300°C for 1 hour to complete consolidation of the powder. The density of the compact was 8.22 gms/cc or 49.5 percent of theoretical density. The compact was vacuum impregnated with copper by dipping in molten copper bath at 1,170°C for 5 minutes under a vacuum of about $10^{-4}$ torr. The impregnated compact (0.35 inches diameter by 4 inches long) was enclosed in a jacket of steel tubing and then swaged to 0.125 inches diameter. The jacket was removed and the rod was then further swaged to 0.080 inches diameter. After swaging, the rod was then leached in nitric acid to remove the copper. The leached compact left a bundle of interconnected tantalum fibers in the form of a felt.

This metal felt was rinsed and removed from the leach bath. The felt was anodized in 0.01% $H_3PO_4$ and tested for capacitor electrical properties such as leakage, capacitance and dissipation factor measured in a 10% $H_3PO_4$ electrolyte. The formation voltage was 200 volts and the capacitance was 30.6 microfarads and on a specific weight basis 6,120 microfarad volts per gram. The felt had a dissipation factor of 32.19 percent and was an overall operable capacitor anode.

EXAMPLE 2

Tantalum felts were made as in Example 1 but with the difference that the compact was rolled to 0.10 inch thick sheet before leaching. The felt exhibited a vigorous swelling up with a volume increase and density decrease of 5-10 times during leaching and floated on the leaching bath. A capacitor formed from the felt at 150 volts had 7,965 microfarad-volts per gram specific capacitance.

EXAMPLE 3

Felts were made as in Example 1 and 2 with the difference that consolidation of the tantalum powder was accomplished by pressing at 18,000 psi and then sintering at 2250°C for 1 hour. Some rods were drawn to wire. After sintering, densities of 60–80 percent of theoretical were obtained in the original compacts. Upon leaching the final composite article of this type, the felt did not swell up. However, high values of capacitance were still obtained indicating substantial formation of new surface as in Examples 1 and 2 (surface enhancement of about 2.5 times).

EXAMPLE 4

Several fibers from the felts of Examples 1 and 2 were encapsulated in epoxy resin and measured to yield an individual fiber diameter indication of 0.002 cm diameter. The Example 2 fibers were 5 to 10 times as long as the diameter of the fiber; the Example 1 fibers were continuous over much longer lengths.

The best mode of using the invention is believed to be selection of a tantalum-copper pair to produce a tantalum felt suitable for use as a capacitor anode. In addition to the above indicated advantages of ease of processing, surface enhancement and work hardening it is a further useful advantage of the invention that it may be practiced if desired, with relatively coarse melting grade tantalum powder (above 325 mesh; i.e., 44 microns) in the original compact rather than the conventional fine capacitor grade powder and the desired surface area increase can be obtained in the fibering process rather than in the original processing of the powder. A further useful aspect of the invention is the above described feature of swelling when the original compact is made in low density (40–60 percent theoretical) and/or when a high degree of working is put into the composite. The swelling of the metal felt, when utilized makes it easier to refill the felt with an anodizing medium and electrolyte and also shortens leaching time for matrix removal. The alternate approach — holding the compact rigid is desirable for fitting some conventional capacitor cans, better control, and maximum volumetric capacitance efficiency.

Examples of alternative valve metals to be powdered and compacted and some of the suitable impregnant materials for forming matrix for working them are:

| COMPACT METAL | IMPREGNANT |
|---|---|
| 1. Tantalum and Niobium and Valve Metal Alloys | Copper, Aluminum, Plastic |
| 2. Titanium and Valve Metal Alloys | Copper, Tin, Woods Metal, Plastics |
| 3. Aluminum and Valve Metal Alloys | Tin, Plastics, Mercury (plus wetting agent) |
| 4. Zirconium and Valve Metal Alloys | Copper and Copper Alloys, Plastics |
| 5. Molybdenum and Valve Metal Alloys (Extrusion) | Copper and Copper Alloys, Plastics |
| 6. Tungsten and Valve Metal Alloys (Extrusion) | Copper and Copper Alloys, Plastics |

The choice (1) is distinctly advantageous in utilizing valve metals which are resistant to attack by acid used to leach the impregnant from the fiber bundle. Some examples of the niobium alloys are the niobium-titanium, niobium-zirconium and ternary niobium-zirconium-titanium-alloys. The skilled metallurgist can provide variations of impregnant to accommodate alloys or other special forms of the valve metals. Such accomodation can also be made in degree of sintering of the original compact and in mechanical working for fibering. The basic criteria for compatibility of film-forming metal and matrix conditions of processing are that:

1. the impregnant shall readily wet the skeleton structure of the sintered compact, or otherwise flow through the interconnected pores of that structure;
2. the impregnant not alloy extensively with the compact under time-temperature conditions of impregnation;
3. the two materials shall have similar hardness and fabrication characteristics to the extent necessary for co-working to fiber the materials;
4. The fibered impregnant shall be easily removable from the compact by chemical or thermal removal means (alternatively the fibered material of the original compact can be removed leaving a fibered product of the impregnant material). Further alternatives involve utilization of the fiber bundle electrode in non-polar capacitors and other electrical or electrochemical devices as well as serving as anodes in polar capacitors. Neither the compact nor the impregnant is limited to metals but may comprise other inorganic or organic materials subject to the foregoing criteria.

While the mechanism of fibering in all manners suitable for various capacitor uses are not completely understood, useful general considerations on processing variables have been generally deduced from experimental data set out below in Example 5.

a. Starting Powder Size

Starting powder size distribution not only has the obvious effect on the starting capacitance of powder compact, and therefore potential capacitance obtainable with given amount of mechanical work, but more importantly, though less obvious, is that starting powder size distribution may be the most important limiting factor in determining maximum realizable capacitance as long as thermal cleaning (i.e., sintering) of fibrous tantalum is a necessary step. Electrical leakage value at high capacitance levels (8,000 cV/gm) also appears to vary with different starting powder size distribution. More will be said below in discussing the effect of the amount of reduction (i.e., mechanical work) on capacitance and leakage.

b. Powder Consolidation Temperature

Aside from refractory metal impurities, high powder consolidation temperatures (2000°C – 2200°C) have the effect of improving the purity level of the powder.

Changing the consolidation temperature from 1800°C to 2000°C and 2200°C did not have appreciable effect on the powder compact density. But, if the starting powder compact density is too high, then the potentially achievable capacitance at a given reduction becomes limited. The density should be 25-64 percent of theoretical density for an equivalent volume of the valve metal.

d. Method of Mechanical Work

Swaging and drawing were the two methods used in bringing ½ inch and 1 inch diameter tantalum/copper composites down to various reduction. Material was swaged to about 0.140 inch diameter and then some was swaged while others are drawn to finish diameters. It was found that in general the all-swaged fibrous material turned out to be more rigid than the swaged-and-drawn material after leaching away the copper.

e. Amount of Mechanical Work

The larger the composite diameter reduction ratio, the smaller the tantalum fiber diameters become and, therefore, the larger is the surface to weight ratio one gets. Potential unit capacitance, therefore, increases linearly with increasing diameter reduction. However, if a post leaching thermal cleaning (i.e., "sintering") step is unavoidable, then actually realizable unit capacitance is no longer monotonically increasing with increasing composite diameter reduction. Instead, due to (a) loss of pore volume and, (b) to a lesser degree, to some loss of free area in favor of growing fiber-to-fiber junction area during cleaning "sinter," actual realizable unit capacitance reaches a maximum peak at an optimum reduction and decreases from then on. The decrease in unit capacitance with increasing reduction after the optimum reduction point is because more pore volume or effective fiber area (i.e., a fiber surface adjacent to a closed or blocked pore is not effective) is lost during the cleaning sinter than that generated by further fibering. The maximum unit capacitance realizable and the value of the optimum diameter reduction ratio are primarily functions of starting powder size distribution, powder compact density, cleaning sinter temperature and to some extent perhaps one or two other variables.

Leakage also increases with increasing diameter reduction but it does not have a single valued correlation with capacitance. This tends to suggest that it is fiber size rather than the amount of surface area that is of importance. The slope of leakage vs. reduction is relatively flat until a critical reduction range is reached (between 15:1 and 25:1 depending on material selection and processing conditions). After that leakage increases exponentially with further reduction (or, in other words, decreasing fiber sizes). Starting powder size distribution, powder compact density, and method of mechanical work seems to have significant effect on the leakage and reduction (or fiber size distribution) relationship.

f. Chemical Leaching of Copper 60 percent nitric acid solution gives a faster leach than 50 percent nitric acid solution. No further experimentation was performed in choosing the leaching solution. However, it should be recognized that many other chemicals can be used. If allowed to expand freely while copper is being leached away, the fibrous tantalum rods can expand to several times the Ta-Cu composite diameter and lose rigidity in the process. Expansion can be restricted and controlled by wrapping the composite in a tantalum mesh or inserting the composite rod in a porous plastic tube. A certain controlled amount of expansion is actually desirable because not only does it allow more thorough leaching and cleaning, but it also prevents pore closing due to oxide film growth during anodization. Almost all the specimens tested were leached in non-flowing acid solution bath. The time needed for leaching increased drastically with increasing specimen size (i.e., diameter). By resorting to a forced flow circulating acid solution leaching, the time involved for copper removal can be reduced by factors of 10 to 20. Flowing solution cleaning probably also gives a more thorough leaching.

g. Lead Attachment

Spot welding of lead wire to fibrous tantalum rod in argon gives consistent test results and is suitable for cylinder slugs. Other forms of lead connections for other anode forms are indicated below.

h. Thermal Cleaning of Fibrous Tantalum

This step is needed when chemical leaching and cleaning cannot do a complete job for a given application or where lead weldment contamination cannot be completely eliminated. The higher the temperature in the cleaning sinter, the better the leakage. Some of the increase capacitance attained by reduction is lost due to cleaning sinter as noted above.

Figure 4:
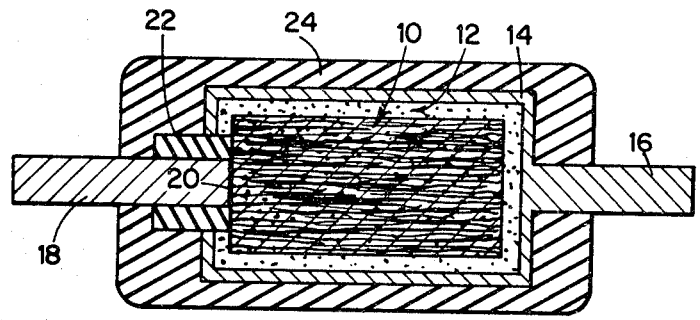
FIG. 4 is a schematic representation of a capacitor utilizing a fiber bundle anode.

Referring now to FIG. 4 there is shown a capacitor after completion of all the steps of FIG. 1 above. It comprises bundle 10 of elongated fibers anodized to a predetermined dielectric film thickness at the fiber surface and (re)impregnated with an electrolyte 12 which may be of the solid or wet type. The electrolyte is in contact with a cathode 14 and cathode lead wire 16. An anode lead wire 18 is butt welded at 20 to the anode and passes through a seal 22. The capacitor as a whole is packaged in a plastic encapsulant 24.

Conventional techniques of anodizing electrolyte impregnation, sealing, packaging, etc., applicable to production of the capacitor are well known to those skilled in the art and therefore not stated here.

Figure 4B:
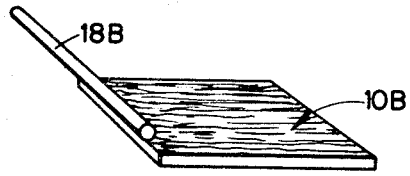
FIGS. 4A–4C are similar representations of three variations of such capacitors or their anodes.
Figure 4A:
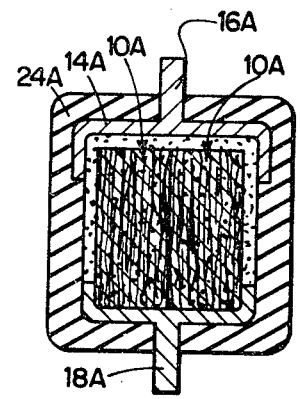

FIG. 4A shows an alternate form of capacitor wherein the anode comprises multiple (two are shown) fiber bundles 10A with a common anode lead wire 18A. It illustrates the point that while the fiber bundle is generally referred to as an "anode" here (or generically "electrode"), it may be an anode building block which is assembled with other blocks to make a complete anode.

FIG. 4B illustrates a sheet form anode 10B produced by rolling with a lead wire 18B welded along an edge and extending perpendicular to the fiber elongation direction.

Figure 4C:
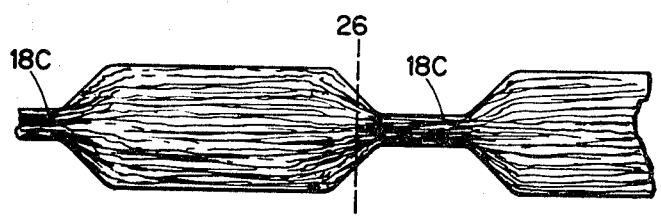

FIG. 4C illustrates a long uncut fiber bundle which is crimped at spaced points to compress the fibers into anode lead wires 18C and cut to individual anodes at 26 (before or after crimping). The crimped section would be fused or impregnated by heating to eliminate capillary leakage of electrolyte.

Capacitor or anode configurations based on conventional design can also be utilized. Several are disclosed for instance in the above cited patents.

EXAMPLE 5

Several fiber bundles were prepared for testing of electrical capacitive properties as a function of various processing conditions. The processing conditions including powder selection compacting and heating are set out in Table 1. The groups of specimens starting from one set of compacting conditions are identified by groups A through F. The mechanical reduction ratios and capacitance, leakage to capacitance ratio and dissipation factor are tabulated in Table 2 for groups A–F, and broken down by data points A1, A2, etc., corresponding to different reduction ratios (compact diameter before to diameter after working). Each data point is an average of several specimens. The Table 2 capacitance to reduction ratio data are plotted log-log for all of groups A through F. The formation voltage for group A tests was 100 volts and 200 volts for groups B through F was carried out in 0.01% $H_3PO_4$. Testing was in a 10% $H_3PO_4$ electrolyte.

TABLE 1

| | Size Powder(MESH-M or Type(MICRON-MU) | Compacting Conditions | Density of Compact (% Theoretical) | Thermal LEACH (°C-hrs) |
|---|---|---|---|---|
| A | SGP –325M+5MU | NOTE 5 | 45 % | 1300-2 |
| B | SGP–100M+200M –(Note 1) | NOTE 5 | 62 | 1600-1 |
| C | SGP–100M+325M (Note 2) | NOTE 6 | 32 | 1600-1 |
| D | SGP–100M+200M (Note 1) | NOTE 6 | 34 | 1600-1 |
| E | SGP –40M+200M (Note 3) | NOTE 5 | 56 | 1600-1 |
| F | SGQ–100M+325M (Note 4) | NOTE 5 | 56 | 1600-1 |

NOTE 1 — Distribution: 3.02 weight % – 60 + 100 mesh; 77.72% – 100 + 200; 2.42% – 200 + 270; 6.62% – 270 + 325; 15.54% – 325.
NOTE 2 — Distribution: 11.4% – 60 + 100; 15.8% – 100 + 200; 23.0% – 200 + 270; 20.2% – 270 + 325; 29.0% – 325.
NOTE 3 — Distribution: 15.7% + 60; 46.84% + 100 – 60; 35.74% + 200 – 100; .48% + 270 – 200; .12% + 325 – 270; 1.06% – 325.
NOTE 4 — Distribution: 9.76% – 100 + 200; 30.42% – 200 + 270; 38.24% – 270 + 325; 20.84% – 325
NOTE 5 — Pressed — about 6000 psi sintered at 2100°C/2 Hours
NOTE 6 — Mold sintered at 1500°C - 1600°C/1 Hour Final sintered at 2200°C/2 Hours SGP and SGQ are commercially available capacitor powder materials produced by sodium reduction of tantalum double salts. SGQ is further treated through melting, hydriding, and dehydriding to produce a greater purity.

TABLE 2

| Sample | Starting Compact Diameter | Diameter Reduction Ratio | Wgt. Specific Capacitance (CV per gm) | L/C | DF (%) |
|---|---|---|---|---|---|
| A0 | 0.45 in. | — | — | — | — |
| A1 | — | 3.4X | 4050 | 0.33 | 51.5 |
| A2 | — | 4.55 | 5990 | 0.5 | 47 |
| A3 | — | 8.22 | 11700 | 0.07 | 37 |
| A4 | — | 20 | 15760 | 0.69 | 20 |
| B0 | 0.792 | — | — | — | — |
| B1 | — | 5.2 | 7000 | .17 | 19 |
| B2 | — | 7.2 | 7860 | .13 | 10 |
| B3 | — | 9.2 | 9500 | .25 | 9.4 |
| B4 | — | 18.4 | 6900 | 1.2 | 18 |
| C0 | 0.442 | — | — | — | — |
| C1 | — | 5.5 | 6366 | .08 | 3.3 |
| C2 | — | 6.3 | 7460 | .1 | 3.1 |
| C3 | — | 8.8 | 8848 | .23 | 5.1 |
| C4 | — | 11 | 8858 | 2 | 3.1 |
| D0 | 0.441 | — | — | — | — |
| D1 | — | 5.5 | 5700 | .08 | 4.5 |
| D2 | — | 6.3 | 6300 | .1 | 3.7 |
| D3 | — | 8.58 | 7200 | .12 | 2.4 |
| D4 | — | 11 | 8100 | .15 | 1.4 |
| E0 | 0.937 | — | — | — | — |
| E1 | — | 6. | 5300 | 1.5 | 15.5 |
| E2 | — | 8.5 | 6000 | 0.15 | 9.5 |
| E3 | — | 10.8 | 6000 | 0.18 | 8.4 |
| E4 | — | 21.2 | 4750 | 4.5 | 2.9 |
| F0 | 0.449 | — | — | — | — |
| F1 | — | 5.6 | 1700 | 0.14 | 54 |
| F2 | — | 6.4 | 2232 | 0.14 | 33.6 |
| F3 | — | 9.0 | 4000 | 0.14 | 0.30 |
| F4 | — | 11.2 | 3600 | 0.1 | 13.4 |

What is claimed is:

1. An elongated porous bundle of fibers of a valve metal formed as an electrolytic capacitor electrode or the like essentially axially oriented in the direction of elongation, the fibers being interconnected by metallurgical bonds, the bonds being elongated parallel to the fiber elongation direction and wherein the bonds are of widely random lengths, but with a major portion of bond lengths substantially greater than average fiber diameter.

2. The product of claim 1 wherein said valve metal is selected from the group comprising tantalum and niobium and their valve metal alloys.

3. The product of claim 2 comprising an electrolyte impregnating the bundsssssssss bundle, an anodic oxide layer of the metal at the metal fiber surfaces, and means providing a connecting electrical lead to said metal and counter-electrode contacting the electrolyte without contacting said fibers.

4. The product of claim 1 wherein the fibers have an average diameter between 5 and 10 microns.

* * * * *

UNITED STATES PATENT OFFICE
CERTIFICATE OF CORRECTION

Patent No. 3742369  Dated June 26, 1973

Inventor(s) Richard W. Douglass

It is certified that error appears in the above-identified patent and that said Letters Patent are hereby corrected as shown below:

Line 2 of claim 3, being line number 38 of column 12 of the Patent, should read -- impregnating the bundle, an anodic --.

Signed and sealed this 6th day of August 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

PATENT NO. : 3,742,369
DATED : June 26, 1973
INVENTOR(S) : Richard W. Douglass

It is certified that error appears in the above-identified patent and that said Letters Patent are hereby corrected as shown below:

The term of this patent subsequent to August 1, 1989, has been disclaimed.

Signed and Sealed this

Seventeenth Day of August 1976

[SEAL]

Attest:

RUTH C. MASON
*Attesting Officer*

C. MARSHALL DANN
*Commissioner of Patents and Trademarks*